US012173613B2

(12) United States Patent
Prihar et al.

(10) Patent No.: US 12,173,613 B2
(45) Date of Patent: Dec. 24, 2024

(54) AIRFOIL TIP CLEANING AND ASSESSMENT SYSTEMS AND METHODS

(71) Applicant: RTX Corporation, Arlington, VA (US)

(72) Inventors: Ron I. Prihar, West Hartford, CT (US); Tracy A. Propheter-Hinckley, Rocky Hill, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/631,497

(22) Filed: Apr. 10, 2024

(65) Prior Publication Data

US 2024/0271532 A1 Aug. 15, 2024

Related U.S. Application Data

(62) Division of application No. 18/339,839, filed on Jun. 22, 2023, now Pat. No. 11,982,203, which is a division of application No. 17/744,530, filed on May 13, 2022, now Pat. No. 11,725,517.

(51) Int. Cl.
*F01D 11/12* (2006.01)
*F01D 5/14* (2006.01)

(52) U.S. Cl.
CPC .............. *F01D 5/14* (2013.01); *F01D 11/122* (2013.01); *F05D 2230/72* (2013.01)

(58) Field of Classification Search
None
See application file for complete search history.

(56) References Cited

U.S. PATENT DOCUMENTS

| | | | | |
|---|---|---|---|---|
| 5,952,110 | A | 9/1999 | Schell et al. | |
| 5,972,424 | A * | 10/1999 | Draghi | C23G 1/20 427/454 |
| 6,701,615 | B2 | 3/2004 | Harding et al. | |
| 7,327,857 | B2 | 2/2008 | Lloyd, Jr. et al. | |
| 7,561,729 | B2 | 7/2009 | Willis | |
| 8,807,955 | B2 | 8/2014 | Wrabel et al. | |
| 9,217,852 | B2 | 12/2015 | Baleine | |
| 10,527,524 | B2 * | 1/2020 | Stoyanov | G01B 5/28 |
| 10,544,698 | B2 | 1/2020 | Stoyanov et al. | |
| 10,914,690 | B2 | 2/2021 | Schneider et al. | |
| 2007/0076845 | A1 | 4/2007 | Subramanian et al. | |
| 2013/0004328 | A1 | 1/2013 | Wrabel et al. | |
| 2015/0300920 | A1 | 10/2015 | DeAscanis et al. | |
| 2016/0003092 | A1 * | 1/2016 | Chamberlain | F01D 5/288 428/323 |

(Continued)

OTHER PUBLICATIONS

USPTO; Restriction/Election Requirement dated Sep. 27, 2022 in U.S. Appl. No. 17/744,530.

(Continued)

*Primary Examiner* — Sabbir Hasan
(74) *Attorney, Agent, or Firm* — SNELL & WILMER L.L.P.

(57) ABSTRACT

A method comprises: flowing a potted component in a liquid state over a tip of an airfoil, the tip of the airfoil having a coating disposed thereon, the coating comprising a metal plating and a plurality of protrusions, each protrusion in the plurality of protrusions extending from the metal plating; allowing the potted component to harden to form a hardened potted component; and removing the hardened potted component from the tip of the airfoil.

9 Claims, 9 Drawing Sheets

(56) References Cited

U.S. PATENT DOCUMENTS

| | | | |
|---|---|---|---|
| 2016/0059278 | A1 | 3/2016 | Mantkowski et al. |
| 2017/0176342 | A1 | 6/2017 | Colletti |
| 2018/0066527 | A1 | 3/2018 | Kadau et al. |
| 2018/0207689 | A1 | 7/2018 | Takeuchi et al. |
| 2019/0172191 | A1 | 6/2019 | Finn et al. |
| 2021/0387746 | A1 | 12/2021 | Danko |

OTHER PUBLICATIONS

USPTO; Non-Final Office Action dated Dec. 19, 2022 in U.S. Appl. No. 17/744,530.
USPTO; Notice of Allowance dated Apr. 5, 2023 in U.S. Appl. No. 17/744,530.
European Patent Office; Search Report dated Sep. 25, 2023 in Application No. 23169584.2.
European Patent Office; Search Report dated Sep. 21, 2023 in Application No. 23169324.3.
European Patent Office; Search Report dated Sep. 25, 2023 in Application No. 23169609.7.
USPTO; Non-Final Office Action dated Nov. 17, 2023 in U.S. Appl. No. 17/744,523.
USPTO; Notice of Allowance dated Jan. 22, 2024 in U.S. Appl. No. 18/339,839.
USPTO; Notice of Allowance dated Apr. 17, 2024 in U.S. Appl. No. 17/744,523.
USPTO; Requirement for Restriction/ Election dated Sep. 6, 2024 in U.S. Appl. No. 17/744,538.

* cited by examiner

AIRFOIL TIP CLEANING AND ASSESSMENT SYSTEMS AND METHODS

CROSS-REFERENCE TO RELATED APPLICATIONS

This application is a divisional of, and claims priority to and the benefit of, U.S. Non-Provisional application Ser. No. 18/339,839, filed Jun. 22, 2023 and entitled AIRFOIL TIP CLEANING AND ASSESSMENT SYSTEMS AND METHODS. The '839 application is a divisional of, and claims priority to and the benefit of, U.S. Non-Provisional application Ser. No. 17/744,530, filed May 13, 2022 entitled AIRFOIL TIP CLEANING AND ASSESSMENT SYSTEMS AND METHODS. Both of which are incorporated in their entirety by reference herein for all purposes.

FIELD

The present disclosure relates generally to cleaning and assessment systems and methods, and more particularly to, cleaning and assessment systems and methods for a tip of an airfoil of a bladed rotor.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of airfoils. The rotor may be an integrally bladed rotor ("IBR") or a mechanically bladed rotor.

The rotor disk and airfoils in the IBR are one piece (i.e., monolithic, or nearly monolithic) with the airfoils spaced around the circumference of the rotor disk. Conventional IBRs may be formed using a variety of technical methods including integral casting, machining from a solid billet, or by welding or bonding the airfoils to the rotor disk.

Tips of airfoils for IBRs are often coated with a coating having an abrasive material, such a as cubic boron nitride ("cBN") coating or the like. The abrasive material is configured to interface with an abradable material disposed radially adjacent to the airfoil tip and coupled to a case, or any other surrounding support structure in the gas turbine engine. Initially, the abrasive material of the coating cuts into the abradable material, forming a trench, a recess, or the like. The coating is configured protect the tips of airfoils for the IBRs from burning up during operation.

At various maintenance intervals, or overhaul, for the gas turbine engine, each tip of an airfoil having the coating disposed thereon is inspected. Inspections are typically performed visually (i.e., in person or with pictures), which can be time consuming due to the number of airfoils in a compressor section of an aircraft, and provide inconsistent success criteria for determining whether a tip of an airfoil is acceptable for entry back into service.

SUMMARY

A method is disclosed herein. The method comprises: flowing a potted component in a liquid state over a tip of an airfoil, the tip of the airfoil having a coating disposed thereon, the coating comprising a metal plating and a plurality of protrusions, each protrusion in the plurality of protrusions extending from the metal plating; allowing the potted component to harden to form a hardened potted component; and removing the hardened potted component from the tip of the airfoil.

In various embodiments, loose particles are coupled to the potted component in response to allowing the potted component to harden. The method can further comprise creating a mold of the tip of the airfoil with a second potted component. The method can further comprise analyzing a molded surface of the mold to determine whether the plurality of protrusions of the coating contain sufficient coverage of the tip of the airfoil. The method can further comprise replacing the coating in response to determining the coating does not maintain sufficient coverage.

In various embodiments, the hardened potted component defines a mold of the tip of the airfoil, the mold including a mold surface having a plurality of recesses. The method can further comprise: scanning the mold; and comparing a recess density for each local area of the mold surface to a recess density threshold corresponding to a protrusion density threshold of the plurality of protrusions. The method can further comprise determining, based on the comparison, whether the coating maintains sufficient coverage for the airfoil to be placed back in service. The method can further comprise replacing the coating in response to determining the coating does not maintain sufficient coverage.

A method is disclosed herein. The method comprises: receiving, via a processor, scanner data for a mold corresponding to a tip of an airfoil of a bladed rotor, the tip including a coating disposed thereon, the coating comprising a metal plating and a plurality of protrusions; comparing, via the processor, a coating parameter of the coating to a coating parameter threshold for the tip of each airfoil of the bladed rotor based on the mold; and determining, via the processor, whether the coating parameter of the airfoil of the bladed rotor does not meet the coating parameter threshold.

In various embodiments, the method further comprises receiving, via the processor, scanner data for a plurality of molds, each mold in the plurality of molds corresponding to a respective tip of a respective airfoil in a plurality of airfoils of the bladed rotor. The method can further comprise receiving, via the processor, an identifier for each mold in the plurality of molds, the identifier corresponding to the respective airfoil in the plurality of airfoils of the bladed rotor. The method can further comprise: determining whether the coating parameter for any airfoil in the plurality of airfoils of the bladed rotor does not meet the coating parameter threshold; and replacing the coating of the tip of the airfoil in response to determining the coating parameter of the coating does not meet the coating parameter threshold. In various embodiments, the coating parameter is protrusion density.

In various embodiments, the method further comprises generating, via the processor, an indication the coating on the tip of the airfoil should be replaced in response to determining a recess density in a mold surface of the mold in a local area of the mold surface is below a recess density threshold corresponding to a protrusion density threshold of the coating.

A coating assessment system is disclosed herein. The system comprises: a scanner; a display; and a tangible, non-transitory computer-readable storage medium having instructions stored thereon that, in response to execution by a processor, cause the processor to perform operations comprising: receiving, via the processor, scanner data for a mold corresponding to a tip of an airfoil of a bladed rotor, the tip including a coating disposed thereon, the coating comprising a metal plating and a plurality of protrusions; analyzing, via the processor, the mold to determine whether the coating is supplying sufficient coverage to the tip of the airfoil; and generating, via the processor and through the display, an indication that the coating should be replaced in response to determining a coating parameter does not meet a coating parameter threshold.

In various embodiments, the coating parameter includes a protrusion density.

In various embodiments, the analyzing the mold includes comparing a recess density in a local area of a mold surface of the mold to a recess density threshold, the recess density corresponding to the coating parameter, the recess density threshold corresponding to the coating parameter threshold. In various embodiments, the recess density corresponds to a number of recesses in the mold surface per unit area.

In various embodiments, the scanner is one of an optical scanner, a mechanical scanner, a laser scanner, a non-structured optical scanner, or a non-visual scanner.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
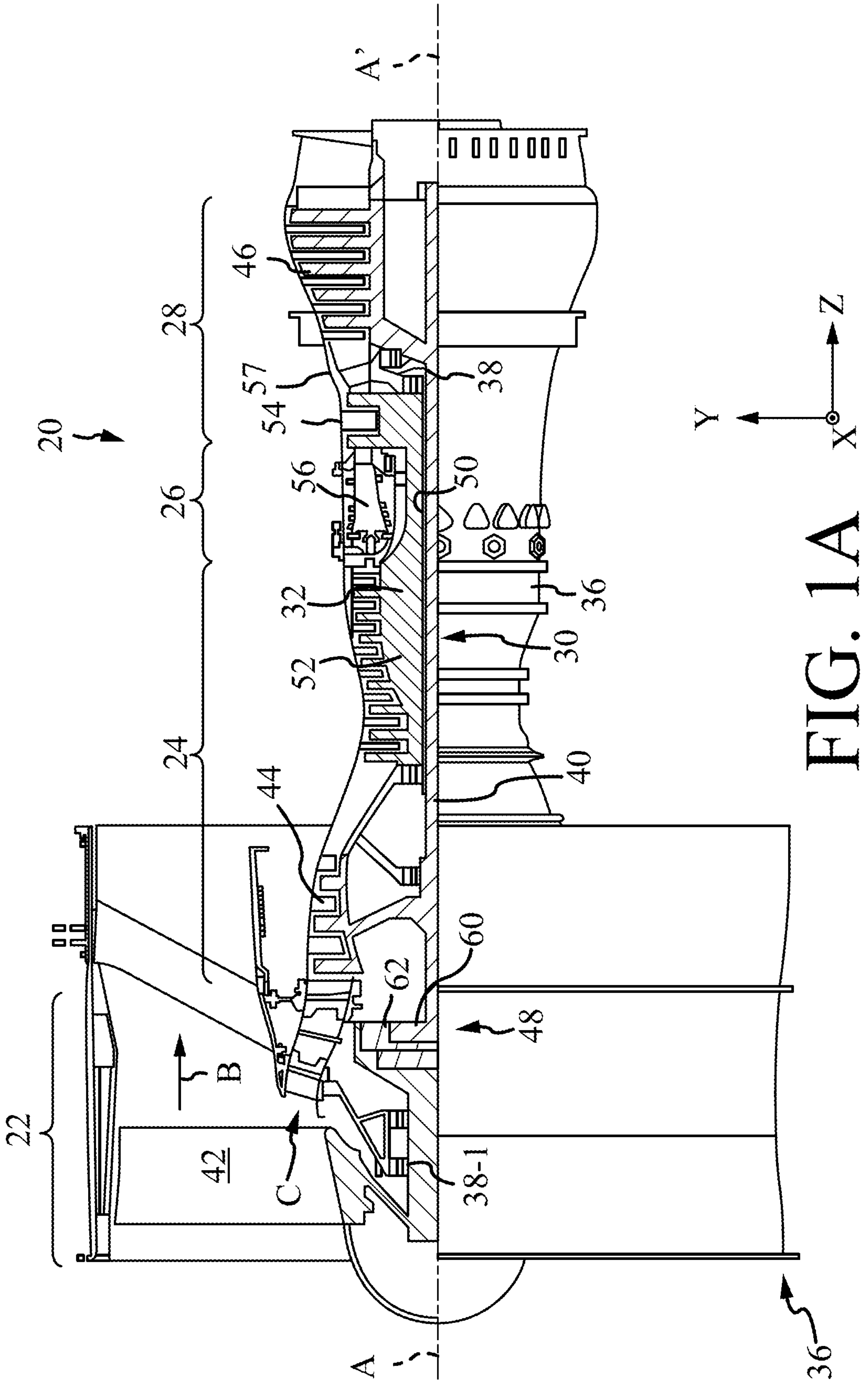
FIG. 1A illustrates a cross-sectional view of a gas-turbine engine, in accordance with various embodiments.

With reference to FIG. 1A, a gas turbine engine 20 is shown according to various embodiments. Gas turbine engine 20 may be a two-spool turbofan that generally incorporates a fan section 22, a compressor section 24, a combustor section 26, and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Figure 1B:
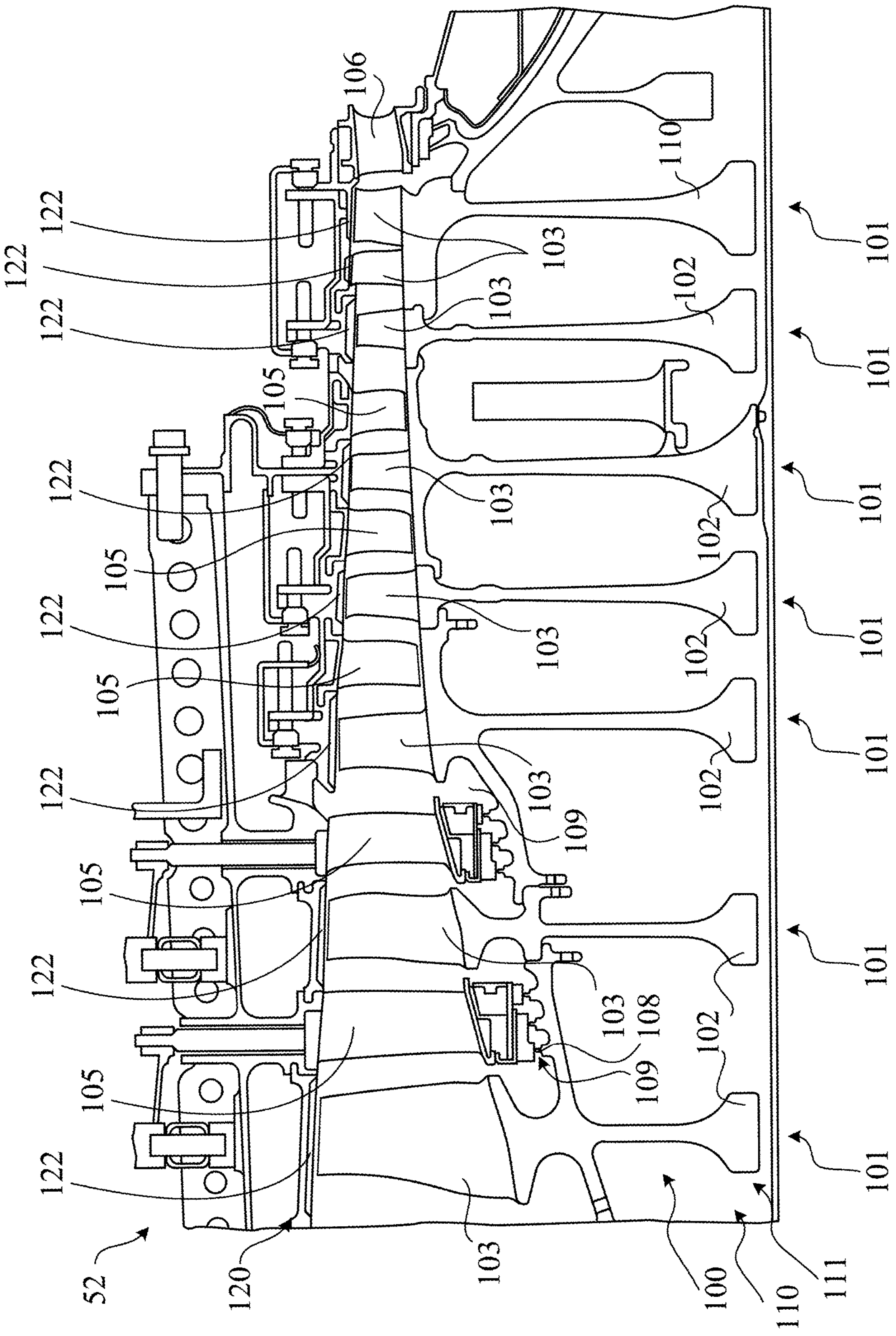
FIG. 1B illustrates a cross-sectional view of a high pressure compressor, in accordance with various embodiments.

In various embodiments, and with reference to FIG. 1B, high pressure compressor 52 of the compressor section 24 of gas turbine engine 20 is provided. The high pressure compressor 52 includes a plurality of blade stages 101 (i.e., rotor stages) and a plurality of vane stages 105 (i.e., stator stages). The blade stages 101 may each include a bladed rotor 100. In various embodiments, the bladed rotor 100 is an integrally bladed rotor, such that the airfoils 103 (e.g., blades) and rotor disks 102 are formed from a single integral component (i.e., a monolithic component formed of a single piece). However, the present disclosure is not limited in this regard. For example, the bladed rotor 100 can comprise a mechanically bladed rotor (i.e., each airfoil 103 mechanically coupled to the rotor disk 102). The airfoils 103 extend radially outward from the rotor disk 102. The gas turbine engine 20 may further include an exit guide vane stage 106 that defines the aft end of the high pressure compressor 52. Although illustrated with respect to high pressure compressor 52, the present disclosure is not limited in this regard. For example, the low pressure compressor 44 may include a plurality of blade stages 101 and vane stages 105, each blade stage in the plurality of blade stages 101 including the bladed rotor 100 and still be within the scope of this disclosure. In various embodiments, the plurality of blade stages 101 forms a stack of bladed rotors 110, which define, at least partially, a rotor module 111 of the high pressure compressor 52 of the gas turbine engine 20.

An outer engine case 120 is disposed radially outward from a tip of each airfoil 103. The outer engine case 120 comprises an abradable material 122 disposed radially adjacent to the tip of each airfoil 103. In this regard, the tip of each airfoil 103 comprises a coating, as described further herein, that includes an abrasive material. The abrasive material is configured to interface with the abradable material 122 of the outer engine case during operation of the gas turbine engine 20. Initially, the abrasive material of the coating cuts into the abradable material, forming a trench, a recess, or the like. The coating is configured protect the tips of airfoils 103 for the bladed rotors 100 from burning up during operation of the gas turbine engine 20.

Referring now to FIG. 2, a perspective view of a bladed rotor 200 is illustrated in accordance with various embodiments. The bladed rotor 200 can be in accordance with any of the bladed rotors 100 from FIG. 1A. The present disclosure is not limited in this regard. The bladed rotor 200 comprises a hub 202, a rotor disk 204 defining a platform 205, and a plurality of airfoils 206. Each airfoil in the plurality of airfoils 206 extends radially outward from the platform 205. For example, an airfoil 210 in the plurality of airfoils 206 extends radially outward from a root 212 of the airfoil 210 to a tip 214 of the airfoil. The root 212 can be integral with the platform 205 or coupled to the platform 205 as described previously herein. The present disclosure is not limited in this regard.

Figure 2A:
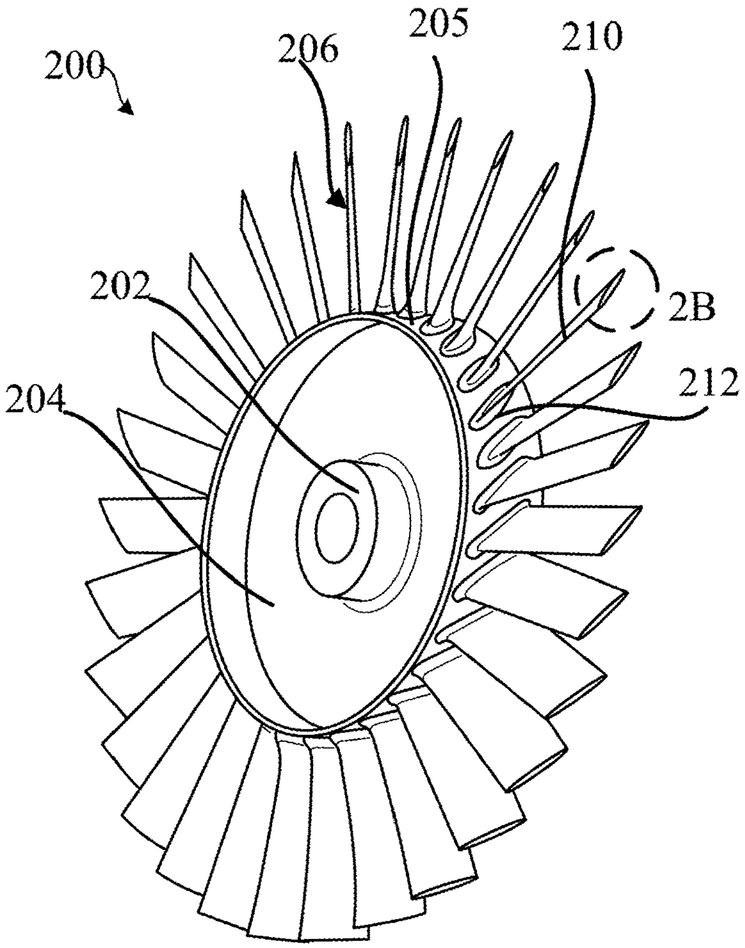
FIG. 2A illustrates a perspective view of a bladed rotor, in accordance with various embodiments.
Figure 2B:
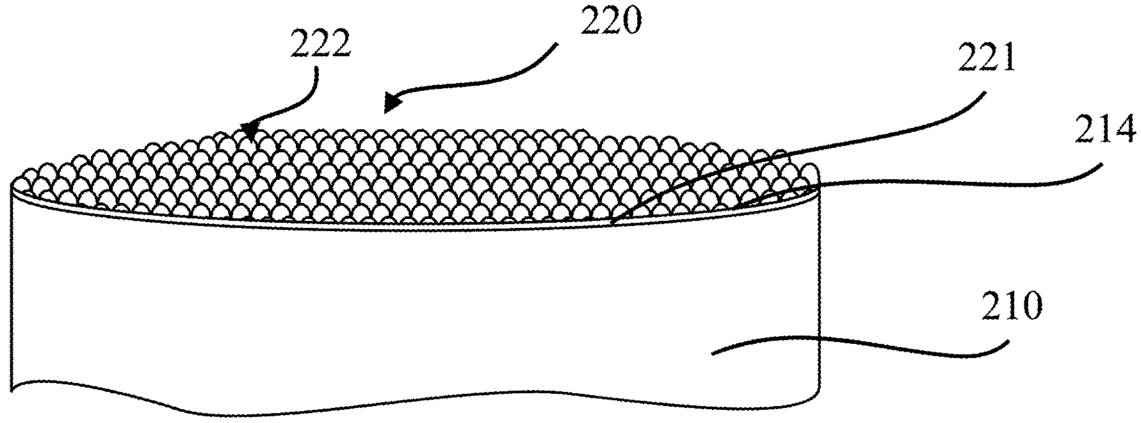
FIG. 2B illustrates a side view of a portion of an airfoil of a bladed rotor, in accordance with various embodiments.

Referring now to FIG. 2B, a detail view of portion of the airfoil 210 from FIG. 2A is illustrated, in accordance with various embodiments. Each airfoil in the plurality of airfoils 206 from FIG. 2A is in accordance with the airfoil 210. The airfoil 210 comprises a coating 220 disposed on the tip 214 of the airfoil 210. In various embodiments, the coating 220 comprises a metal plating 221 (e.g., a nickel plating or the like), and an abrasive material (e.g., alumina, cubic boron nitride, silicon carbide, tungsten carbide, silicon nitride, or titanium diboride) extending outward from the metal plating 221. For example, the coating 220 includes a plurality of protrusions 222 (i.e., grits). Each protrusion in the plurality of protrusions 222 extends radially outward from the tip 214 of the airfoil 210 (e.g., towards the abradable material 122 from FIG. 1B when installed). In various embodiments, each protrusion in the plurality of protrusions 222 of the coating 220 comprises cubic boron nitride.

Figure 3:
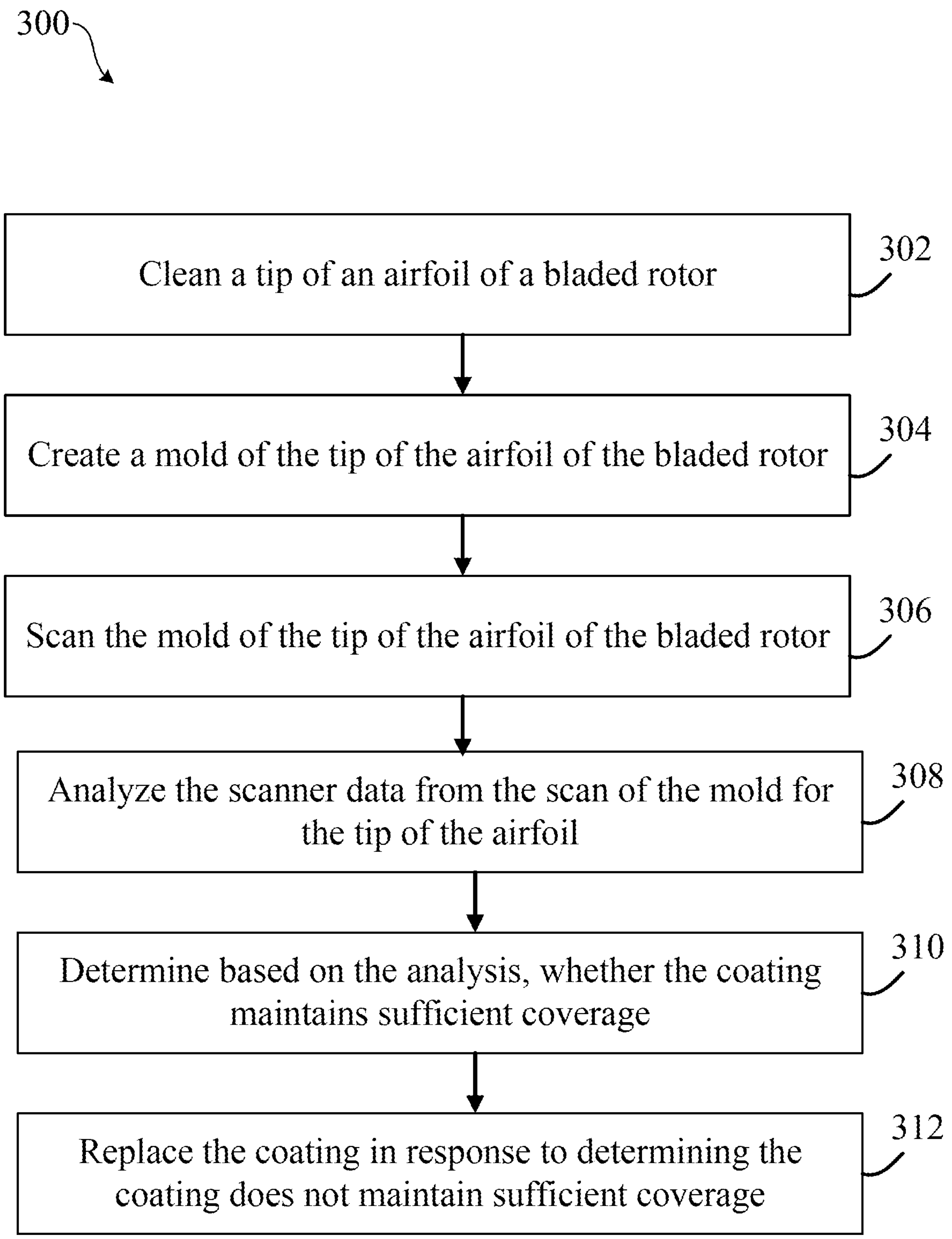
FIG. 3 illustrates a method of inspecting and assessing a tip of an airfoil for a bladed rotor, in accordance with various embodiments.
Figure 4C:
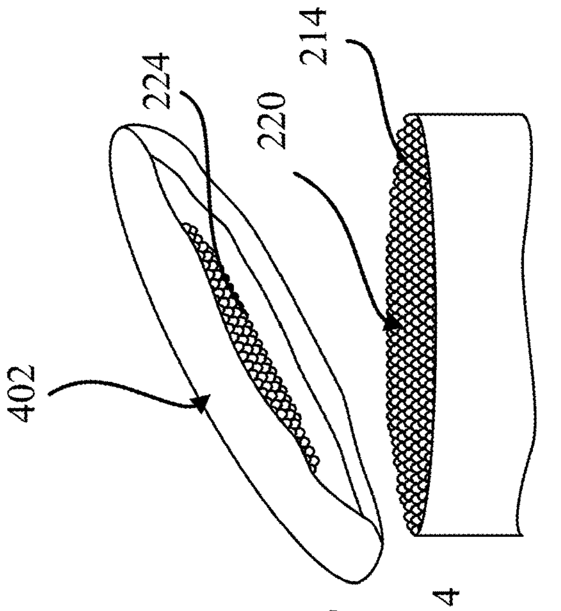
FIG. 4C illustrates a tip of an airfoil of a bladed rotor during a cleaning process, in accordance with various embodiments.
Figure 4B:
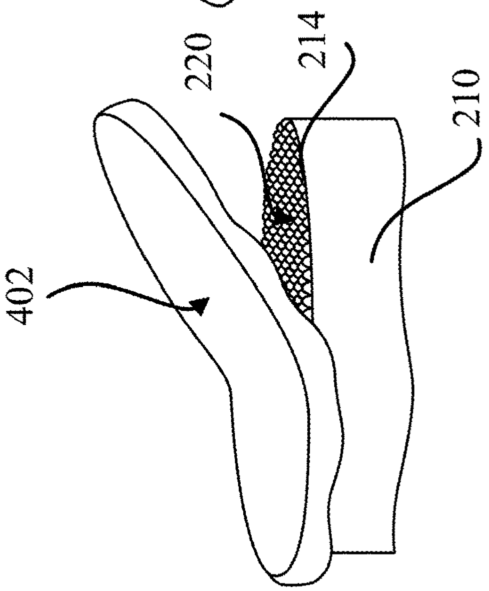
FIG. 4B illustrates a tip of an airfoil of a bladed rotor during a cleaning process, in accordance with various embodiments.
Figure 4A:
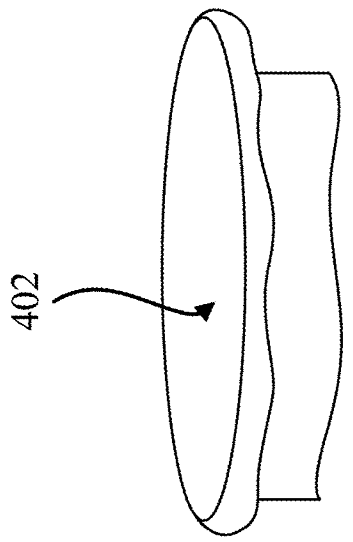
FIG. 4A illustrates a tip of an airfoil of a bladed rotor during a cleaning process, in accordance with various embodiments.

Referring now to FIG. 3, a method 300 for assessing a tip of an airfoil for a bladed rotor (e.g., bladed rotor 200) is illustrated, in accordance with various embodiments. The method 300 comprises cleaning a tip 214 of airfoil 210 of a bladed rotor 200 (step 302). In various embodiments, the method 300 includes cleaning each tip 214 for each airfoil 210 of the bladed rotor 200. In this regard, all airfoils 210 of a bladed rotor may be cleaned prior to proceeding in method 300. In various embodiments, cleaning the tip 214 of the airfoil 210 of bladed rotor 200 may include disposing a potting component. A "potting component," as described herein may be a thermoplastic elastomer, silicone, silicone rubber, natural rubber, epoxy, or the like. With brief reference to FIGS. 4A-C, a potting component 402 may be flowed over, in a liquid, or semi-liquid, state, the tip 214 of an airfoil 210 to cover the entirety of the tip 214 (FIG. 4A). Once the potting component 402 hardens, the potting component 402 may be removed off of the tip 214 of the airfoil 210 as shown in FIGS. 4B and 4C. In this regard, loose particles 224 from the tip 214 of the airfoil 210 may be removed from the airfoil 210. In various embodiments, the loose particles include abradable material 122 as described previously herein. In various embodiments, the loose particles 224 comprise protrusions from the plurality of protrusions 222, which were loosened during operation.

Referring back to FIG. 3, the method 300 further comprises scanning the tip 214 of the airfoil 210 (step 304). The method 300 comprises cleaning a tip 214 of airfoil 210 of a bladed rotor 200 (step 302). Although method 300 is described with respect to a single tip of a single airfoil, the present disclosure is not limited in this regard. For example, steps of method 300 may be performed for the tip of each airfoil of a bladed rotor 200 prior to moving on to a next step, in accordance with various embodiments. For example, the method 300 can include cleaning the tip 214 for each airfoil 210 of the bladed rotor 200. In this regard, all airfoils 210 of a bladed rotor may be cleaned prior to proceeding in method 300, then scanned in step 304, then analyzed in step 306, and so on. Thus, an inspection and analysis time for determining whether the tip 214 of each airfoil 210 in the plurality of airfoils 206 of the bladed rotor 200 may be greatly reduced relative to typical inspection and analysis systems and methods.

In various embodiments, cleaning the tip 214 of the airfoil 210 of bladed rotor 200 may include disposing a potting component. A "potting component," as described herein may be a thermoplastic elastomer, silicone, silicone rubber, natural rubber, epoxy, or the like. With brief reference to FIGS. 4A-C, a potting component 402 may be flowed over, in a liquid state, or pushed onto the surface in a semi-liquid state, the tip 214 of an airfoil 210 to cover the entirety of the tip 214 (FIG. 4A). Once the potting component 402 hardens, the potting component 402 may be removed off of the tip 214 of the airfoil 210 as shown in FIGS. 4B and 4C. In this regard, loose particles 224 from the tip 214 of the airfoil 210 may be removed from the airfoil 210. In various embodiments, the loose particles 224 include abradable material 122 as described previously herein. In various embodiments, the loose particles 224 comprise protrusions from the plurality of protrusions 222, which were loosened during operation.

Figure 5A:
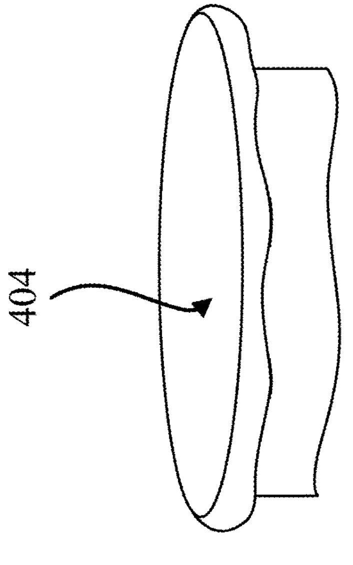
FIG. 5A illustrates a tip of an airfoil of a bladed rotor during a cleaning process.
Figure 5B:
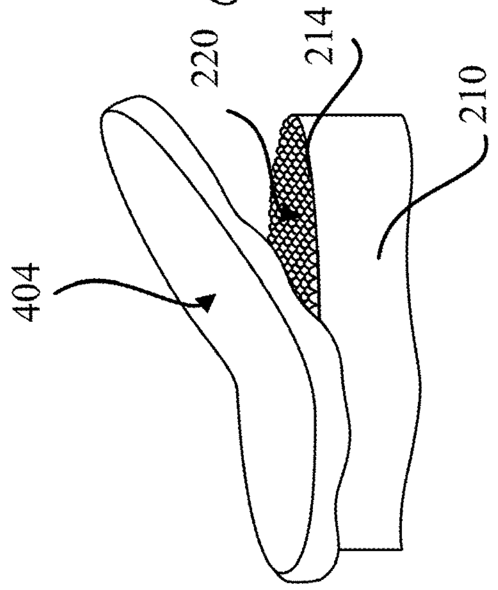
FIG. 5B illustrates a tip of an airfoil of a bladed rotor during a molding process, in accordance with various embodiments.
Figure 5C:
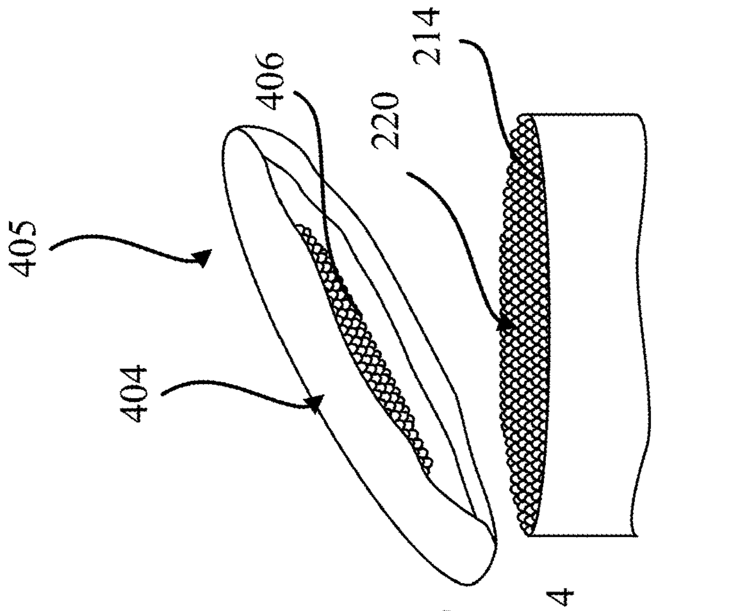
FIG. 5C illustrates a tip of an airfoil of a bladed rotor during a molding process, in accordance with various embodiments.

In various embodiments, the method 300 further comprises creating a mold of the tip of the airfoil of the bladed rotor (step 304). The mold may be created in a similar manner to the cleaning step 302. For example, with reference now to FIGS. 5A-C, a second potting component 404 can be flowed over, in a liquid state, the tip 214 of the airfoil 210 to cover the entirety of the tip 214 (FIG. 5A). Once the second potting component 404 hardens, the potting component 404 can be removed off of the tip 214 of the airfoil 210 as shown in FIGS. 5B and 5C. As the tip was previously cleaned in step 302, there will be no loose particles 224 in the second potting component 404. In this regard, after removal of the second potting component 404, a mold 405 defining a mold surface 406 with a complimentary shape to the tip 214 of the airfoil 210 is created, in accordance with various embodiments.

Figure 6:
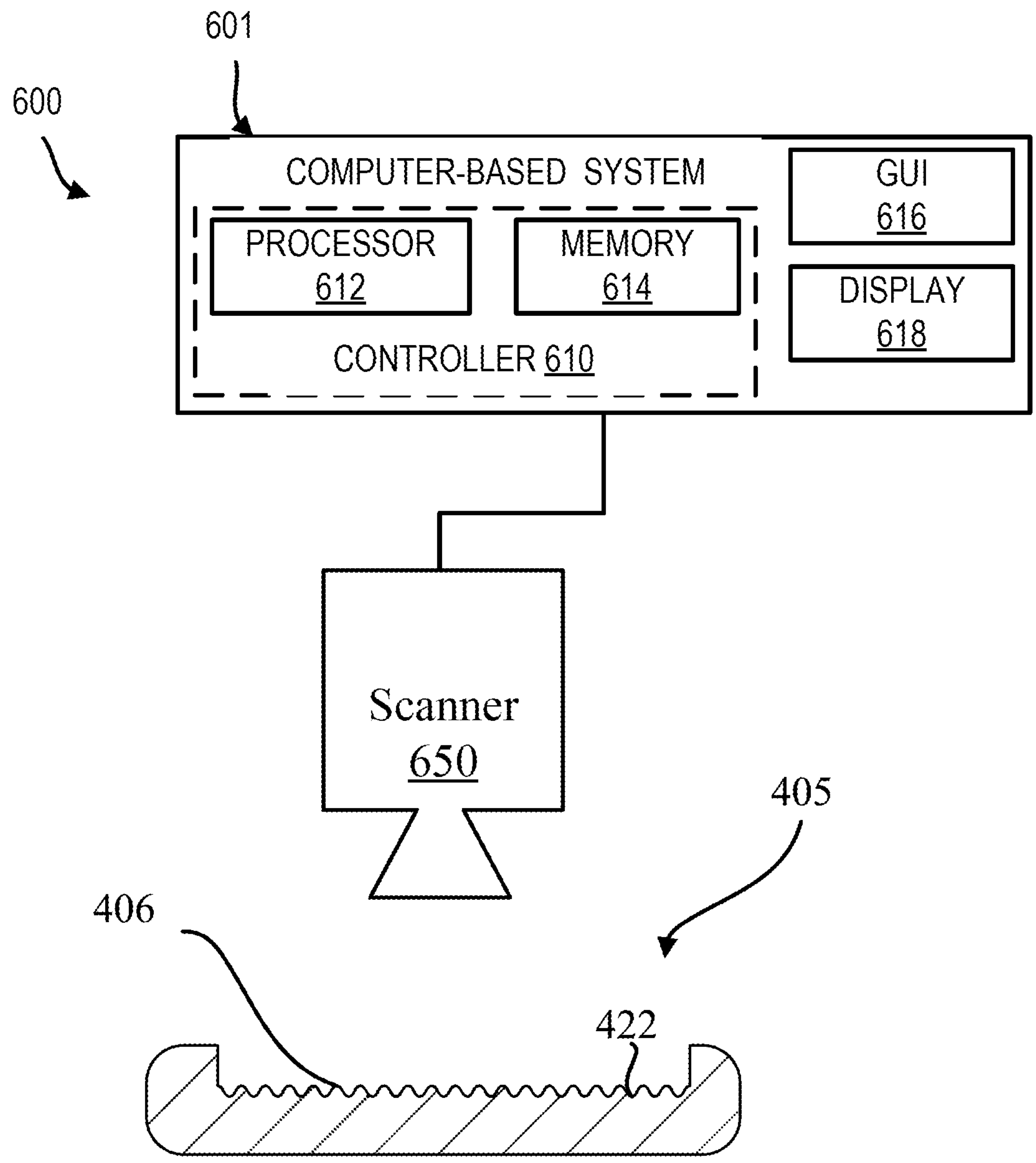
FIG. 6 illustrates an airfoil tip assessment system in use, in accordance with various embodiments.

Referring back to FIG. 3, the method 300 further comprises scanning the mold 405 of the tip 214 of the airfoil 210 of the bladed rotor 200 (step 306). With reference now to FIG. 6, an airfoil tip assessment system 600 for performing step 306 of method 300 is illustrated, in accordance with various embodiments. The airfoil tip assessment system 600 includes a scanner 650 and a computer-based system 601 including a controller 610, a graphical user interface (GUI) 616, and a display 618. In various embodiments, by scanning the mold 405 from step 304, as opposed to the tip 214 of the airfoil 210 directly can be significantly easier to handle due to being significantly smaller in size relative to the bladed rotor. Similarly, the tip 214 of the airfoil 210 could be inspected and assessed in an installed state without taking the bladed rotor 200 off the gas turbine engine 20, in accordance with various embodiments. Thus, an airfoil tip inspection time may be greatly reduced for a bladed rotor 200, in accordance with various embodiments.

In various embodiments, the computer-based system 601 comprises a controller 610. In various embodiments the GUI 616, display 618, and the scanner 650 are in electronic communication (e.g., wireless or wired) with the scanner 650. In various embodiments, controller 610 may be integrated into computer system. In various embodiments, controller 610 may be configured as a central network element or hub to access various systems and components of the airfoil tip assessment system 400. Controller 610 may comprise a network, computer-based system, and/or software components configured to provide an access point to various systems and components of the inspection system. In various embodiments, controller 610 may comprise a processor 612. In various embodiments, controller 610 may be implemented in a single processor. In various embodiments, controller 610 may be implemented as and may include one or more processors and/or one or more tangible, non-transitory memories (e.g., memory 614) and be capable of implementing logic (e.g., memory 614). Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 610 may comprise a processor 612 configured to implement various logical operations in response to execution of instructions, for example, instructions stored on a non-transitory, tangible, computer-readable medium (e.g., memory 614) configured to communicate with controller 610.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the scanner 650 comprises an optical scanner (e.g., structured light scanners, such as white light scanners, structured blue light scanners, or the like), a mechanical scanner, a laser scanner, a non-structured optical scanner, a non-visual scanner (e.g., computed tomography), or the like. In various embodiments, the scanner 650 provides scanner data illustrating elemental particle distribution. Thus, a user can distinguish between nickel alloys, titanium alloys, cubic boron nitride of a coating, etc. Thus, based on scanner data from the scanner 650, a coating 220 of a tip 214 of an airfoil 210 can be assessed in a more accurate and precise manner as described further herein.

In various embodiments, in response to scanning the mold 405, a digital representation of the mold 405 (e.g., a point cloud, a surface model, or the like) can be received by the controller 610 and converted to a two-dimensional or three-dimensional model (e.g., a Computer Aided Design (CAD) model or the like). The mold surface 406 includes a plurality of recesses 422 corresponding to the plurality of protrusions 222 of the coating 220. In this regard, the two-dimensional or three-dimensional model can be analyzed, as described further herein to determine whether a total coverage of the plurality of protrusions 222 are sufficient for the airfoil 210 to be placed back in service, in accordance with various embodiments.

Referring back to FIG. 3, the method 300 further comprises analyzing the model (e.g., the three-dimensional or two-dimensional model) of the mold 405 for the tip 214 of the airfoil (step 308). In various embodiments, the computer-based system 401 of the airfoil tip assessment system 600 is configured to analyze the model of the mold 405.

Figure 7:
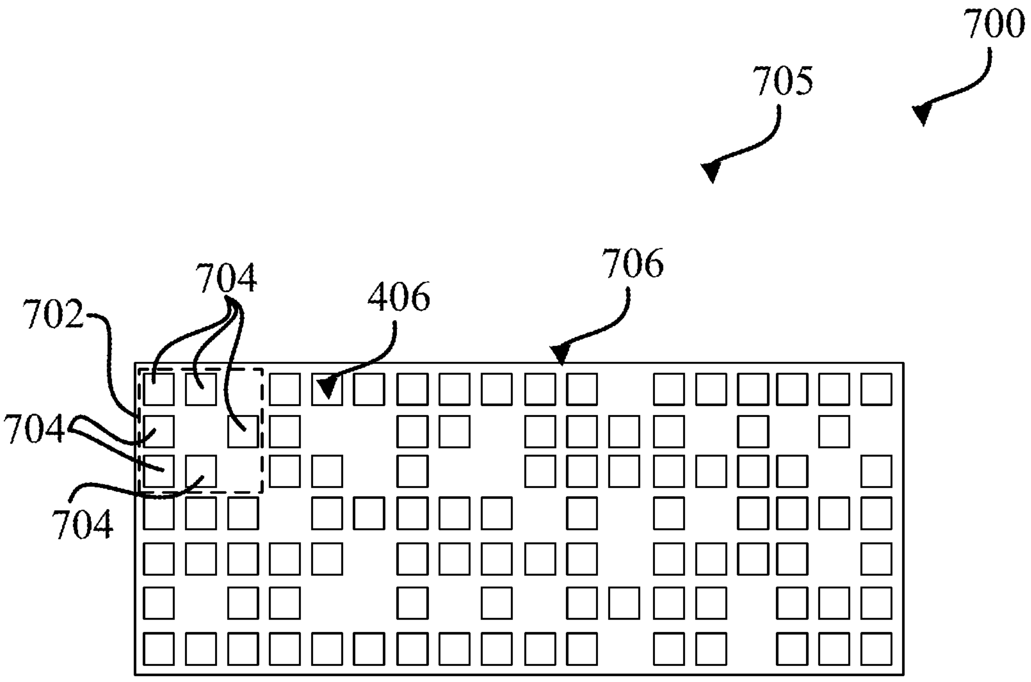
FIG. 7 illustrates a digital representation from a scanner of the airfoil tip assessment system, in accordance with various embodiments.

For example, referring now to FIG. 7, a model 700 based on scanner data (e.g., a point cloud, a surface model, or the like) from the scanner 650, is illustrated, in accordance with various embodiments. The model 700 includes a two-dimension or three dimensional digital rendering 705 of the mold 405 defining digital recesses 704 corresponding to the recesses 422 from FIG. 6. Based on the model 700, each and every local area of the mold 405 of the tip 214 the airfoil 210 can be analyzed to determine if the local area has a recess density above a recess density threshold.

For example, a local area 702 can be analyzed by comparing a number of digital recesses 704 to a threshold number of recesses (i.e., corresponding to an acceptable number of protrusions for the tip 214 of the airfoil 210). In various embodiments, the local area 702 comprises seven recess (i.e., corresponding to seven protrusions for the tip 214 of the airfoil 210), where the local area 702 typically has nine recesses (i.e., corresponding to seven protrusions for the tip 214 of the airfoil 210) when originally manufactured. Although the typical newly manufactured coating for an airfoil tip includes nine protrusions in the local area 702, a protrusion threshold (i.e., to achieve acceptable abradable characteristics of coating 220), six protrusions may be acceptable. Each recess in the plurality of recesses 422 corresponds to a protrusion in the plurality of protrusions 222 of the coating 220. Thus, the term "protrusions" are used when referring to the tip 214 of the airfoil 210 and the term "recesses" is used when referring to the mold 405 of the tip 214 of the airfoil, in accordance with various embodiments. Similarly, a "recess density threshold" for the mold 405 corresponds to a "protrusion density threshold" for the tip 214 of the airfoil 210 to achieve acceptable abradable characteristics of coating 220. "Protrusion density" as referred to herein is a number of protrusions per unit area in the plurality of protrusions 222 of the coating 220. Similarly, "recess density" as referred to herein is a number of recess per unit area in the plurality of recesses 422 of the mold 405. Although described herein as utilizing protrusion density/recess density, the present disclosure is not limited in this regard. For example, other coating parameters, such as surface roughness can be utilized and are still within the scope of this disclosure.

In various embodiments, a recess threshold for the local area 702 may be six protrusions or greater. In various embodiments, by analyzing a three-dimensional, or two dimensional digital representation, and comparing to acceptable criteria for a coating 220 being inspected at various maintenance intervals or overhaul, a significantly more consistent, precise, and reliable, and/or efficient assessment process can be developed.

Referring back to FIG. 3, the method 300 further comprises determining, based on the analysis of step 308, whether the coating maintains sufficient coverage (step 310). In this regard, an entire mold surface 406 of a mold 405 corresponding to a tip 214 of an airfoil 210 can be analyzed based on the model 700 (e.g., a digital representation) in FIG. 7, and if any local area (e.g., local area 702) is determined to have a recess density less than a recess density threshold, then the controller 410 of the airfoil tip assessment system 400 displays the coating 220 at the tip 214 of the airfoil 210 as having to be replaced.

The method 300 further comprises replacing the coating 220 with a new coating in response to determining the coating 220 does not maintain sufficient coverage (step 310). Replacing the coating 220 may be a time intensive process, in accordance with various embodiments. In this regard, by accurately and consistently assessing a coating 220 of an airfoil, unnecessary replacement of coating 220 may be eliminated, greatly decreasing an overhaul or maintenance interval for a bladed rotor 200, in accordance with various embodiments.

Figure 8:
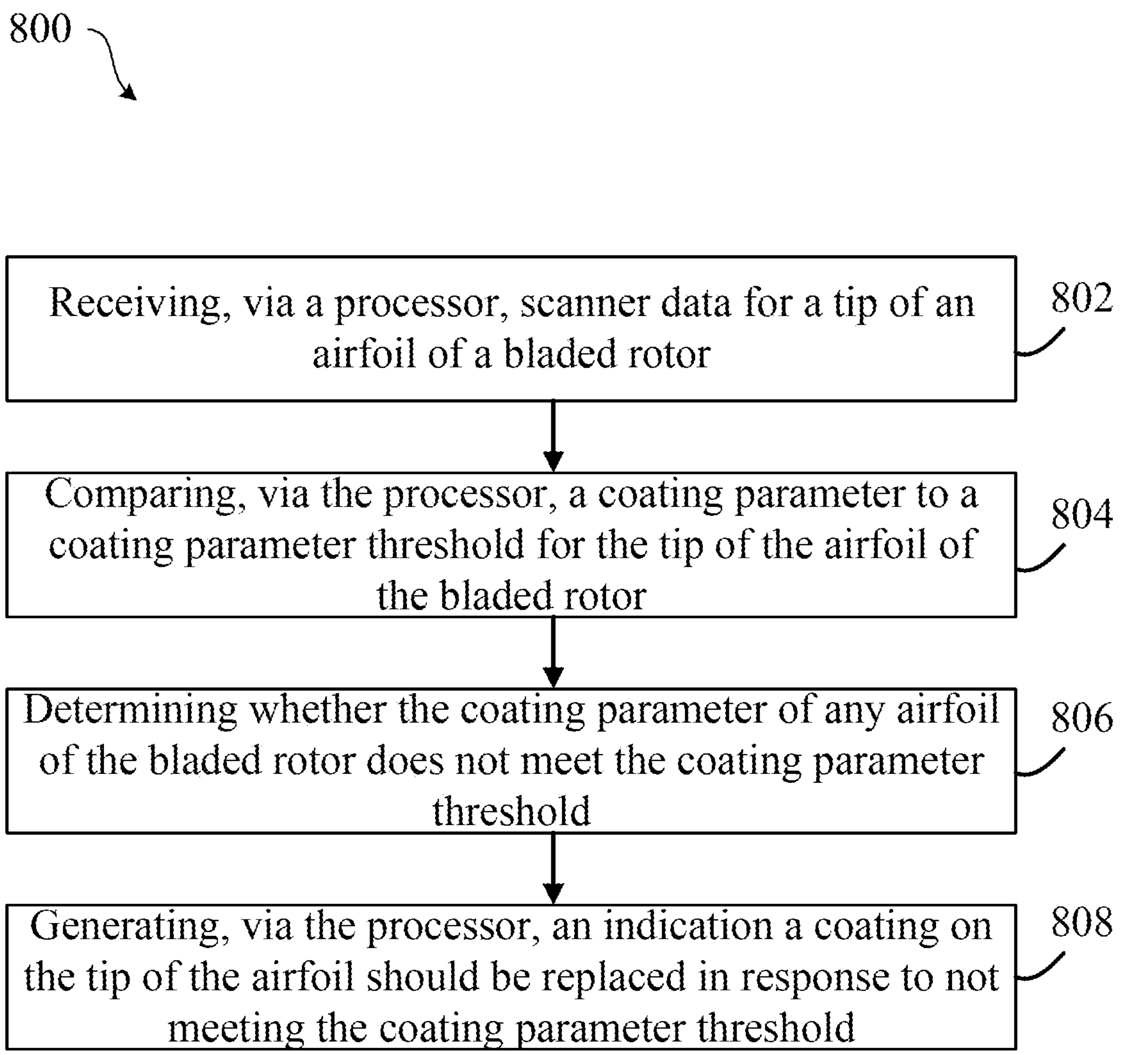
FIG. 8 illustrates an assessment process performed by the airfoil tip assessment system, in accordance with various embodiments.

Referring now to FIG. 8, an assessment process 800 performed by the airfoil tip assessment system 600 from FIG. 6, is illustrated, in accordance with various embodiments. The assessment process 800 comprises receiving, via the processor 612, scanner data (e.g., a point cloud, a surface model, or the like) from the scanner 650 for a mold 405 having a mold surface 406 corresponding to a tip 214 of an airfoil 210 in a plurality of airfoils 206 of a bladed rotor 200 (step 802).

In various embodiments, the receiving step 802 further comprises receiving an identifier for the mold 405. In this regard, after creating a mold, in accordance with step 304 of method 300 from FIG. 3, an identifier may be coupled to the mold 405 (e.g., a radio frequency identification (RFID) tag, a barcode, or the like). The identifier can correspond to an airfoil in the bladed rotor 200. In this regard, a mold 405 for the tip 214 of each airfoil 210 in the plurality of airfoils 206 of the bladed rotor 200 can be scanned in succession, and all airfoils for the bladed rotor 200 can be assessed simultaneously via the process 800. In this regard, inspection and assessment efficiency for the tip 214 of each airfoil 210 of the bladed rotor 200 can be greatly improved relative to typical visual inspection and measurements.

The process 800 further comprises comparing, via the processor 612, a coating parameter (e.g., surface roughness, recess/protrusion density, etc.) to a coating parameter threshold for the tip 214 of each airfoil 210 in the plurality of airfoils 206 of the bladed rotor 200 (step 804). In various embodiments, the comparison is made by determining a recess density in the mold surface 406 and comparing the recess density to a recess density threshold corresponding to a protrusion density threshold for an acceptable tip 214 of the airfoil 210. In this regard, a recess density determined in step 704 of process 800 corresponds directly to a protrusion density of the tip 214 of the airfoil 210 from which the mold was molded.

The process 800 further comprises determining, via the processor 612, whether the coating parameter of the airfoil of the bladed rotor does not meet the coating parameter threshold (step 806). In response to not meeting the coating parameter threshold, the processor 612 generates an indication that the coating 220 on the tip 214 of the airfoil 210 corresponding to the mold 405 should be replaced (step 708). In this regard, the mold 405 can be analyzed to determine whether the coating 220 corresponding to the mold maintains sufficient coverage for the airfoil 210 to re-enter service.

In various embodiments, the process 800 is more efficient and less time consuming relative to visual inspections typically employed for assessing coverage of a coating on a tip of an airfoil. In various embodiments, scanning the molds 405 for the tip 214 of each airfoil 210 can be performed very efficiently due to their significantly smaller size relative to a bladed rotor 200 and ease of handling relative to the bladed rotor 200. In various embodiments, the cleaning process described herein (e.g., step 302 of method 300 and FIGS. 4A-4C) provide an efficient method of removing loose particles 224 from a tip 214 of an airfoil 210 prior to an assessment of the tip 214, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:

flowing a potted component in a liquid state over a tip of an airfoil, the tip of the airfoil having a coating disposed thereon, the coating comprising a metal plating and a plurality of protrusions, each protrusion in the plurality of protrusions extending from the metal plating;

allowing the potted component to harden to form a hardened potted component; and removing the hardened potted component from the tip of the airfoil.

2. The method of claim 1, wherein loose particles are coupled to the potted component in response to allowing the potted component to harden.

3. The method of claim 2, further comprising creating a mold of the tip of the airfoil with a second potted component.

4. The method of claim 3, further comprising analyzing a mold surface of the mold to determine whether the plurality of protrusions of the coating contain sufficient coverage of the tip of the airfoil.

5. The method of claim 4, further comprising replacing the coating in response to determining the coating does not maintain sufficient coverage.

6. The method of claim 1, wherein the hardened potted component defines a mold of the tip of the airfoil, the mold including a mold surface having a plurality of recesses.

7. The method of claim 6, further comprising:

scanning the mold; and comparing a recess density for each local area of the mold surface to a recess density threshold corresponding to a protrusion density threshold of the plurality of protrusions.

8. The method of claim 7, further comprising determining, based on the comparing, whether the coating maintains sufficient coverage for the airfoil to be placed back in service.

9. The method of claim 8, further comprising replacing the coating in response to determining the coating does not maintain sufficient coverage.

* * * * *